Patented Jan. 10, 1933

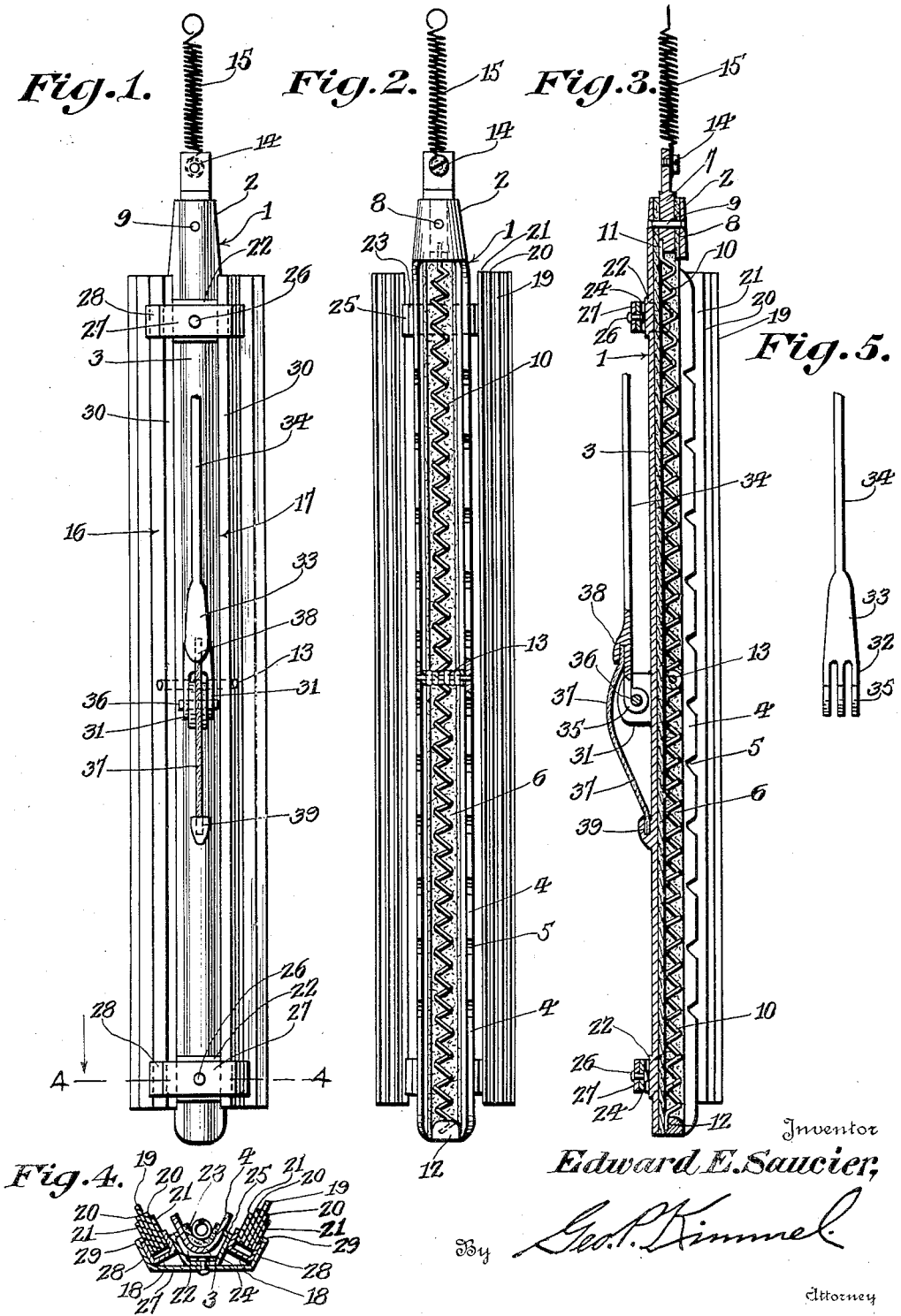

1,894,200

UNITED STATES PATENT OFFICE

EDWARD E. SAUCIER, OF LOWELL, MASSACHUSETTS, ASSIGNOR OF ONE-HALF TO DONAT GERVAIS, OF LOWELL, MASSACHUSETTS

OSCILLATORY COMBINED WINDSHIELD HEATER AND WIPER DEVICE

Application filed March 20, 1931. Serial No. 524,178.

This invention relates to an oscillatory combined windshield heater and wiper device and has for its object to provide, a device of such class, in a manner as hereinafter set forth, which when active will maintain that portion of a windshield for vision for a driver of an automotive vehicle clear of rain, snow or sleet to enable the driver to have clear vision when the weather is inclement thereby reducing accidents to a minimum during the travel of the vehicle.

A further object of the invention is to provide, in a manner as hereinafter set forth, a device of the class referred to with means when the device is active to prevent the accumulation of snow or the formation of sleet upon the windshield whereby the vision of the driver is not impaired.

Further objects of the invention are to provide, in a manner as hereinafter set forth, an oscillatory combined windshield heater and wiper which is simple in its construction and arrangement, strong, durable, compact, thoroughly efficient when in use, readily assembled and comparatively inexpensive to manufacture.

With the foregoing and other objects in view, the invention consists of the novel construction, combination and arrangement of parts as hereinafter more specifically described and illustrated in the accompanying drawing wherein is shown an embodiment of the invention, but it is to be understood that changes, variations and modifications may be resorted to which fall within the scope of the invention as claimed.

In the drawing wherein like reference characters denote corresponding parts throughout the several views:—

Figure 1 is a front elevation of a combined windshield heater and wiper device in accordance with this invention.

Figure 2 is a rear elevation thereof.

Figure 3 is a longitudinal sectional view of the device.

Figure 4 is a section on line 4—4 Figure 1.

Figure 5 is a fragmentary view in rear elevation of the oscillatory suspending arm for the device.

The device includes an electric heater generally indicated at 1 and consisting of a carrier formed of a tubular part 2 and a channeled shaped part 3 of V-shaped cross section. One end of the part 3 is integral with the inner end of the outer side portion of part 2. The part 3 is of materially greater length than part 2 and opens inwardly. The sides of part 3 are indicated at 4 and the lengthwise edge of each side 4 is provided with spaced notches 5 to form openings for regulating hot air between wiper and windshield. The part 3 is formed of any suitable metallic material. Secured in the part 3 and extending into part 2 is a strip of insulation material 6 positioned against the inner face of the base or front of part 3 and the inner faces of sides 4. The lengthwise edges of strip 6 are spaced from the lengthwise edges of sides 4. The strip 6 in cross section corresponds to the cross sectional contour of part 3. The strip 6 extends from the free end of part 3 to the outer end of part 2. Extending into and projecting from part 2 is a conductor member 7 which is insulated from part 2 by strip 6 and also by an insulating member 8 arranged in part 2. The conductor member 7 is secured to part 2 by a rivet 9 of non-conducting material. Positioned in strip 6 lengthwise thereof is an electrical heater element 10 having one end attached to member 7, as at 11 and its other end anchored with the outer end of strip 6 and part 3 as at 12. Connected to the sides 4, extending transversely of the carrier is a retainer 13 for element 10. The retainer 13 is formed of non-conducting material. Attached to the member 7, as at 14 is a resistance coil 15 which is adapted to be connected with an electrical source.

The device also includes a pair of oppositely inclined wiper elements which are arranged in spaced relation with respect to the opposite sides of the heater 1. The wiper elements are indicated at 16, 17 and each of which project inwardly beyond the lengthwise edges of the sides 4 of the carrier. The elements 16, 17 are of less length than the length of the heater 1.

The elements 16, 17 are of like construction and each of which consists of a flat channel shaped holder 18 which opens inwardly and is open at each end. Mounted in the holder 18 and projecting inwardly therefrom is a set of flexible wiper blades. The set consists of an inner, a pair of intermediate and a pair of outer blades 19, 20 and 21 respectively. The blade 19 projects beyond blades 20 and the latter beyond blades 21. Blades 20 are of the same width, but of greater width than blades 21. Blade 19 is of greater width than blades 20. Blades 21 are of the same width. Each blade of the set has its ends flush with the ends of the holder.

The carrier at a point in proximity to each end of part 3 thereof is formed with an enlargement on its outer periphery, as at 22 to provide peripheral shoulders 23 spaced from the lengthwise edges of the sides 4 of part 3. Seated against each enlargement 22 and engaging with the shoulders 23 provided by the latter is a flanged resilient inner coupling member 24. The flanges of member 24 are indicated at 25, are oppositely disposed and snap against the shoulders to anchor the member to the carrier. The outer portion of member 24 is spaced from the enlargement, see Figure 4. Connected to the outer portion of each member 24, by the holdfast device 26 is an outer coupling member 27 formed with a pair of oppositely inclined resilient sides 28 provided with inturned flanges 29 to engage against the lengthwise edge of the outer side of the holder 18 of element 16 and the lengthwise edge of the outer side of the holder 18 of element 17.

The coupling members 24 and 27 in connection with the enlargement provide for detachably connecting the wiper elements to the heater and to form spaces 30 between the carrier and holders for the passage of air to cool the heater element 10.

The part 3 of the carrier has projecting outwardly therefrom at its transverse center a pair of parallel, spaced apertured ears 31 which extend between the tines 32 of the forked lower end 33 of an oscillatory suspension or hanger rod 34 for the device. Each tine 33 has its free end looped, as at 35 which align with the apertures in the ears 31. A pivot pin 36 couples the tines 32 to the ears 31. The rod 34 is also connected to part 3 of the carrier by a flexible member 37 which is anchored at one end to rod 34, as at 38 and has its other end secured to part 3 as at 39.

What I claim is:—

1. A combined windshield heater and wiper comprising, a pair of wiper elements, an electrical heater interposed between said elements and having spaced shoulders, a pair of spaced, resilient inner clamps of V-form having integral parts engaging with said shoulders for resiliently clamping the heater thereto, and a pair of outer V-clamps being secured centrally to said inner clamps and having their side portions opposing in spaced relation the side portions of the inner clamps, said elements arranged between said opposed side portions, and the side portions of the outer clamps having integral parts coacting with the side portions of the inner clamps for resiliently clamping said elements between the opposed side portions of said clamps.

2. A combined windshield heater and wiper comprising, a pair of wiper elements, a carrier arranged between and spaced from said elements, an electric heating means arranged within, secured to and extending lengthwise of the carrier, said carrier having spaced, parallel shouldered portions on its outer periphery, a pair of spaced, parallel, resilient inner clamps having said carrier extending therethrough, said clamps having side portions provided with means engaging with said shouldered portions for resiliently clamping the carrier thereto, and a pair of spaced, parallel, resilient outer clamps secured centrally to said inner clamps and having side portions opposing in spaced relation the side portions of the inner clamps, said elements positioned between the opposed side portions of said clamps, and the side portions of the outer clamps provided with means coacting with the side portions of the inner clamps for resiliently clamping said elements between side portions of said clamps.

In testimony whereof, I affix my signature hereto,

EDWARD E. SAUCIER.